(12) United States Patent
Sun et al.

(10) Patent No.: US 12,303,927 B2
(45) Date of Patent: May 20, 2025

(54) SPRAY GUN

(71) Applicant: POSITEC POWER TOOLS (SUZHOU) CO., LTD., Suzhou (CN)

(72) Inventors: Yimin Sun, Suzhou (CN); Shisong Zhang, Suzhou (CN); Hongfeng Zhong, Suzhou (CN)

(73) Assignee: POSITEC POWER TOOLS (SUZHOU) CO., LTD., Suzhou (CN)

( * ) Notice: Subject to any disclaimer, the term of this patent is extended or adjusted under 35 U.S.C. 154(b) by 400 days.

(21) Appl. No.: 17/747,206

(22) Filed: May 18, 2022

(65) Prior Publication Data

US 2022/0274123 A1 Sep. 1, 2022

Related U.S. Application Data

(63) Continuation of application No. PCT/CN2020/130133, filed on Nov. 19, 2020.

(30) Foreign Application Priority Data

Nov. 19, 2019 (CN) .......................... 201911133021.X (51) Int. Cl.
   *B05B 7/24* (2006.01)
(52) U.S. Cl.
   CPC .......... *B05B 7/2416* (2013.01); *B05B 7/2429* (2013.01)
(58) Field of Classification Search
   USPC .......................... 239/373, 407, 408, 409, 412
   See application file for complete search history.

(56) References Cited

U.S. PATENT DOCUMENTS

| 7,360,720 | B2 | 4/2008 | Göhring et al. |
| 8,944,348 | B2* | 2/2015 | Zhou ...................... B05B 7/2424 |
| | | | 222/401 |
| 2007/0252019 | A1* | 11/2007 | Peterson ................. B05B 1/002 |
| | | | 239/375 |

(Continued)

FOREIGN PATENT DOCUMENTS

| CN | 201579154 U | 9/2010 |
| CN | 202606329 U | 12/2012 |
| CN | 203227575 U | 10/2013 |

(Continued)

OTHER PUBLICATIONS

International Search Report issued in corresponding PCT Application No. PCT/CN2020/130133, dated Jan. 27, 2021.

(Continued)

*Primary Examiner* — Christopher S Kim
(74) *Attorney, Agent, or Firm* — Westbridge IP LLC (57) ABSTRACT

A spray gun includes a first shell, a fan module, a sleeve, a nozzle assembly and a spray bar assembly. The fan module includes a brushless motor. The sleeve is formed or mounted on the first shell. The nozzle assembly is disposed at an end of the sleeve. The spray bar assembly is received in the sleeve and configured to move along a longitudinal axis of the spray bar assembly to open or close the liquid outlet. The fan module has a maximum outer diameter D1 between 30 mm and 80 mm, and a rotation axis of the brushless motor is parallel to or coincident with the longitudinal axis of the spray bar assembly. In this way, the spray gun is more compact and consistent with ergonomics.

16 Claims, 8 Drawing Sheets

(56) References Cited

U.S. PATENT DOCUMENTS

2016/0008832 A1    1/2016  Huang

FOREIGN PATENT DOCUMENTS

| | | |
|---|---|---|
| CN | 103752442 A | 4/2014 |
| CN | 203750734 U | 8/2014 |
| CN | 207013187 U | 2/2018 |
| CN | 109590122 A | 4/2019 |
| CN | 209138939 U | 7/2019 |
| DE | 202005005054 U1 | 8/2006 |

OTHER PUBLICATIONS

Written Opinion issued in corresponding PCT Application No. PCT/CN2020/130133, dated Jan. 27, 2021.
Extended European Search Report issued in counterpart European Patent Application No. 20890942.5, dated Nov. 14, 2022.

* cited by examiner

SPRAY GUN

CROSS-REFERENCE TO RELATED APPLICATIONS

This application is a continuation of International Application No. PCT/CN2020/130133, filed on Nov. 19, 2020, which claims priority to Chinese Patent Application No. 201911133021.X, filed on Nov. 19, 2019. The disclosures of the aforementioned applications are hereby incorporated by reference in their entireties.

TECHNICAL FIELD

The present disclosure relates to the field of handheld spraying equipment, and particularly to a spray gun.

BACKGROUND

In home decoration, coating spraying for walls, ceilings, and other workpieces has always been a part requiring relatively high workloads and construction skills. Therefore, as a core for coating spraying, the working ability and comfort in use of a coating spraying device have always been the focus of attention and improvement in the industry. A paint spraying device is a typical coating spraying device.

A High Volume Low Pressure type (HVLP-type) paint gun blows air out of an air duct through a centrifugal fan, and atomizes and sprays paint at a nozzle by the Venturi principle. However, a low-speed brush DC motor is currently used for HVLP-type paint spraying, which is large and heavy, so a relatively high work intensity is brought to a user. Moreover, the brush DC motor is relatively low in rotational speed, and in order to increase an intake air volume, a fan with a large enough fan diameter is needed. As a result, a tail of the whole spray gun is large, with the weight concentrated thereon, and it is difficult for the user to hold.

Therefore, it is necessary to propose a novel spray gun to solve the foregoing problem.

SUMMARY

For overcoming the shortcomings of a conventional art, the present disclosure is intended to provide a spray gun, which may reduce a total weight and achieve a reasonable overall layout, thereby reducing load of a user when holding the spray gun and improving user experiences in manipulation.

In order to solve the foregoing problem, the following technical solution is used in the present disclosure. A spray gun includes: a first shell; a fan module, received in the first shell and configured to generate an atomization airflow, the fan module comprises a brushless motor and a fan driven to rotate by the brushless motor; a sleeve, formed or mounted on the first shell; a nozzle assembly, disposed at an end of the sleeve away from the fan module and provided with a liquid outlet; and a spray bar assembly, received in the sleeve and configured to move along an longitudinal axis of the spray bar assembly to open or close the liquid outlet; the fan module has a maximum outer diameter D1 between 30 mm and 80 mm; a rotation axis of the brushless motor is parallel to or coincident with the longitudinal axis of the spray bar assembly.

In a possible implementation, the maximum outer diameter D1 is more than or equal to 30 mm and less than or equal to 45 mm, the rotation axis of the brushless motor is coincident with the longitudinal axis of the spray bar assembly.

In a possible implementation, the maximum outer diameter D1 is greater than 45 mm and less than or equal to 80 mm, the rotation axis of the brushless motor is parallel to the longitudinal axis of the spray bar assembly at a distance L1 satisfying $(D1-45)/2+2.5$ mm$\leq L1 \leq 20$ mm.

In a possible implementation, the spray gun includes a handle for an operator to hold. The rotation axis of the brushless motor is farther away from the handle than the longitudinal axis of the spray bar assembly in a direction perpendicular to the longitudinal axis.

In a possible implementation, the spray gun further includes an air pressure chamber radially supported in the first shell. The fan module is received in the air pressure chamber.

In a possible implementation, the fan module further includes a fan shell. The fan and the brushless motor are sequentially arranged in the fan shell in a movement direction of the airflow. An air inlet ring cover and an air outlet are provided on the fan shell. When the fan rotates, the airflow enters the fan shell from the air inlet ring cover, and flows from the air outlet to the air pressure chamber.

In a possible implementation, the fan module is supported in the air pressure chamber by a vibration damping structure. Therefore, vibrations generated by the high-speed motor are transmitted to the first shell after being attenuated by the vibration damping structure, and vibrations felt by a user during holding are reduced.

In a possible implementation, the fan is rotatably disposed in the air inlet ring cover and the outer diameter of the inlet ring cover corresponding to the location of a fan blade along an axis of the fan is the maximum outer diameter D1 of said fan module.

In a possible implementation, the fan module further includes a circuit board configured to control an operation of the brushless motor, the circuit board being fixedly connected to the fan shell and arranged downstream of the brushless motor along a direction of said airflow.

In a possible implementation, an outer diameter of the fan shell corresponding to an axial position where the circuit board is located is D2, where $D2 \leq D1$.

In a possible implementation, a value of D2 ranges from 40 mm to 55 mm.

In a possible implementation, the brushless motor has a rated power between 250 W and 500 W and a speed range between 60000 rpm and 120000 rpm.

Beneficial Effects

According to the spray gun provided in the present disclosure, the high-speed brushless motor is used for the fan module, of which the rated power ranges from 250 W to 500 W, while the rotational speed ranges from 60,000 rpm to 120,000 rpm, so that the size of the fan module may be reduced under the same working ability, furthermore, the total weight is reduced, and load of the user when holding the spray gun is reduced. Moreover, the significant reduction of the structure size of the fan module makes the longitudinal axis of the spray bar assembly parallel to or coincident with the rotation axis of the motor, so that the whole spray gun is more compact and consistent with ergonomics.

Specific implementations of the present disclosure are disclosed in detail with reference to the following description and the accompanying drawings, and a manner in which the principle of the present disclosure may be used is specified. It should be understood that, the implementations of the present disclosure are not limited in scope.

Features described and/or illustrated for one implementation may be used in the same or similar manner in one or more other implementations, in combination with, or in place of features of other implementations.

It should be understood that terms "comprise" and/or "include" used in this specification indicate that there are features, integers, steps, or assemblies, but does not exclude that there is one or more other features, integers, steps, or assemblies.

BRIEF DESCRIPTION OF DRAWINGS

To describe the technical solutions in the embodiments of the present disclosure or in the existing technologies more clearly, the following briefly describes the accompanying drawings required for describing the embodiments or the existing technologies. Apparently, the accompanying drawings in the following description merely show some embodiments of the present disclosure, and a person skilled in the art may still derive other drawings from these accompanying drawings without creative efforts.

DETAILED DESCRIPTION OF THE EMBODIMENTS

To make a person skilled in the art understand the technical solutions in the present disclosure better, the following clearly and completely describes the technical solutions in the implementations of the present disclosure with reference to the accompanying drawings in the implementations of the present disclosure. Apparently, the described implementations are merely some but not all of the implementations of the present disclosure. All other implementations obtained by a person of ordinary skill in the art based on the implementations of the present disclosure without creative efforts shall fall within the protection scope of the present disclosure.

It should be noted that, when an element is referred to as "being arranged on" another element, the element may be directly on the another element, or there may be another intermediate element. When an element is considered to be "connected to" another element, the element may be directly connected to the another element, or another intervening element may also be present. The terms "vertical", "horizontal", "left", "right" and similar expressions used in this specification are only for purposes of illustration but not indicate a unique implementation.

Unless otherwise defined, meanings of all technical and scientific terms used in this specification are the same as that usually understood by a person skilled in the art to which the present disclosure belongs. In this specification, terms used in the specification of the present disclosure are merely intended to describe objectives of the specific embodiments, but are not intended to limit the present disclosure. The term "and/or" used in this specification includes any and all combinations of one or more related listed items.

Referring to FIGS. 1, 2, 3a, and 3b, a first implementation of the present disclosure provides a spray gun 100. The spray gun 100 may be configured to spray paint, water (e.g., for watering flowers), etc. Preferably, the spray gun 100 is paint spraying equipment, e.g., a paint gun. The spray gun 100 atomizes and sprays paint at a nozzle through a high-speed airflow by the Venturi principle.

Figure 1:
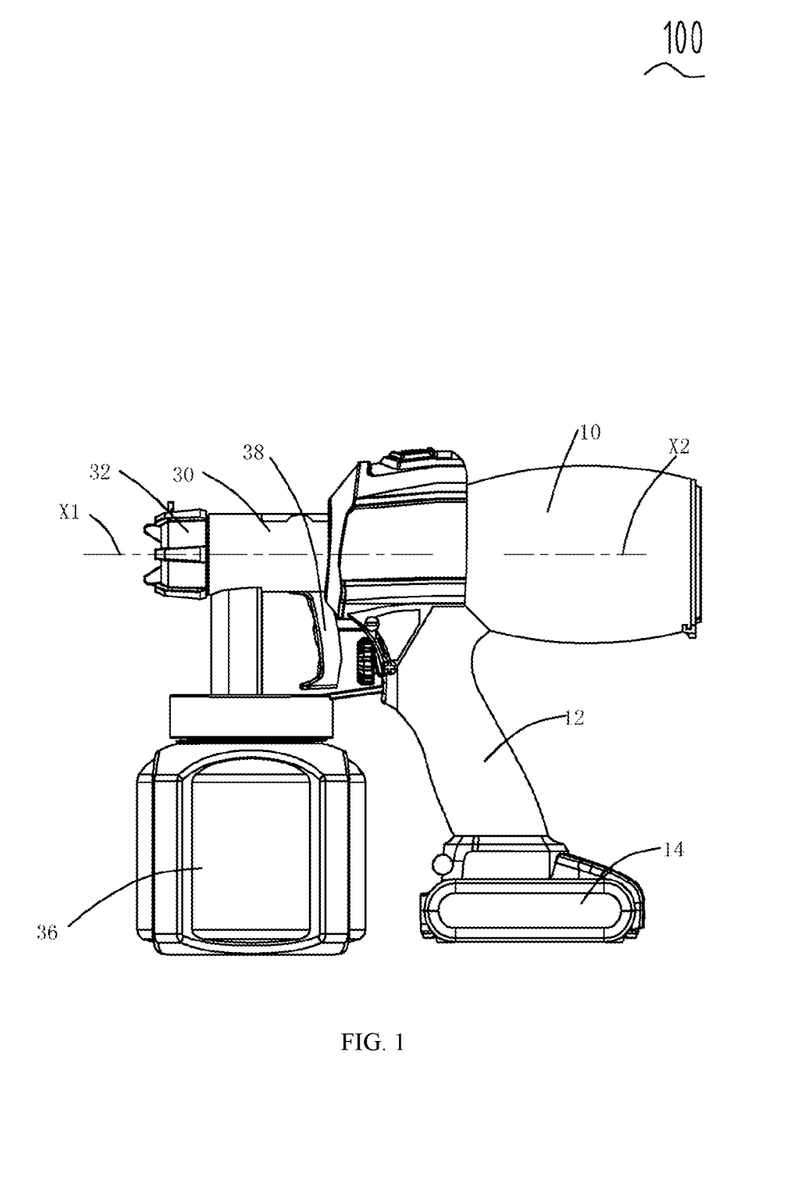
FIG. 1 is a schematic diagram of a spray gun according to a first implementation of the present disclosure.
Figure 2:
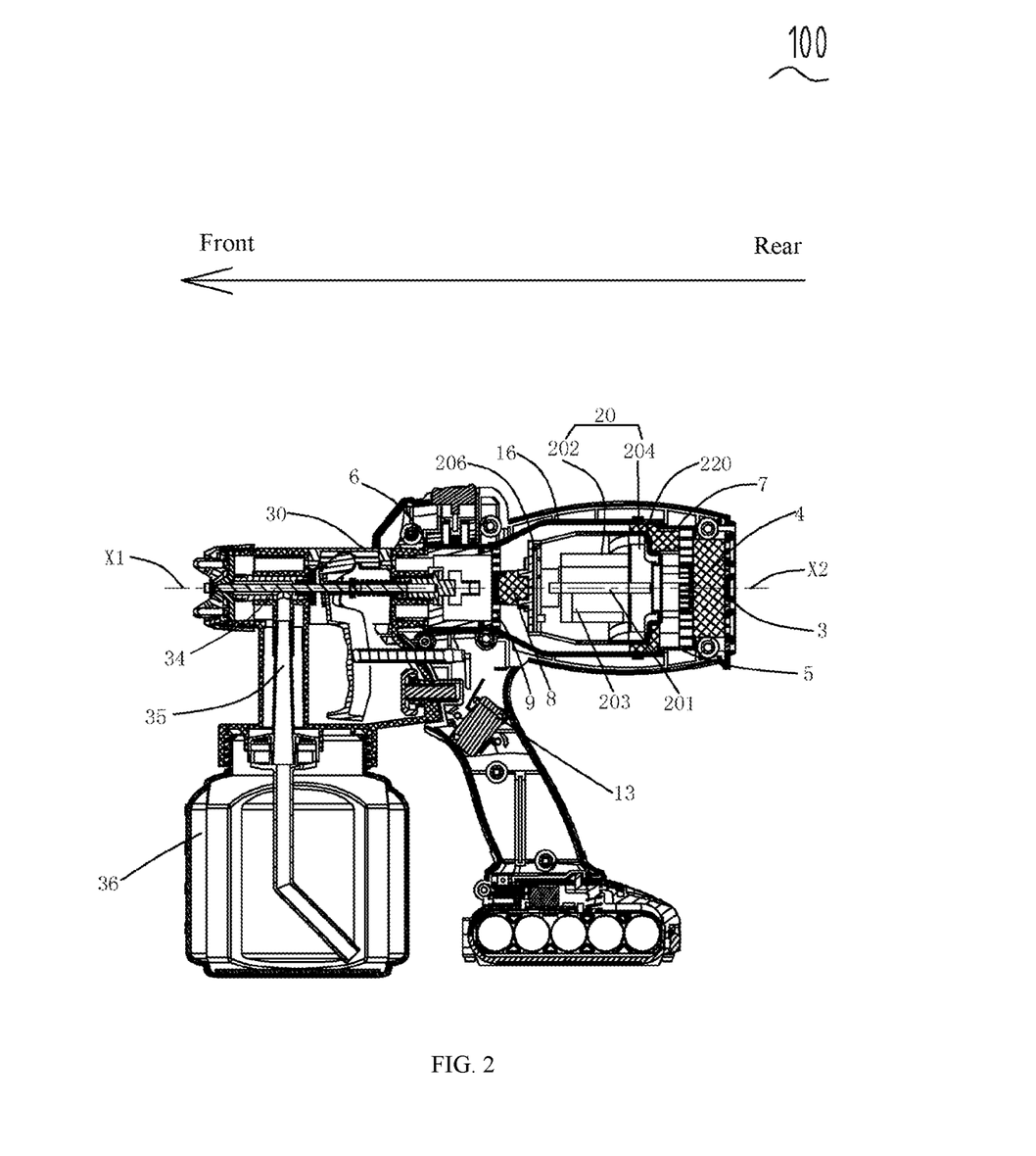
FIG. 2 is a sectional view of the spray gun in FIG. 1.

The spray gun 100 mainly includes a power assembly, a working head assembly, a liquid storage pot, and a direct-current power supply.

The power assembly includes a first shell 10 and a fan module 20. The fan module 20 is received in the first shell 10, and is configured to generate an airflow. Specifically, the fan module 20 includes a brushless motor 202 and a fan 204 driven by the brushless motor 202 to rotate.

Figure 8A:
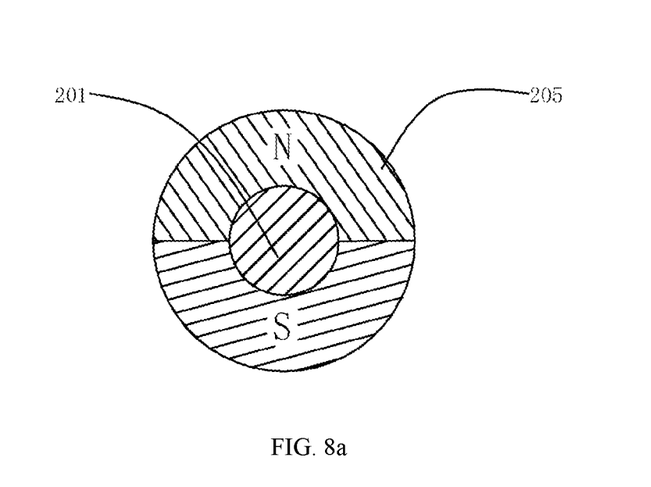
FIG. 8a is a schematic structural diagram of a rotor of a brushless motor involved in a spray gun according to an embodiment of the present disclosure.
Figure 8B:
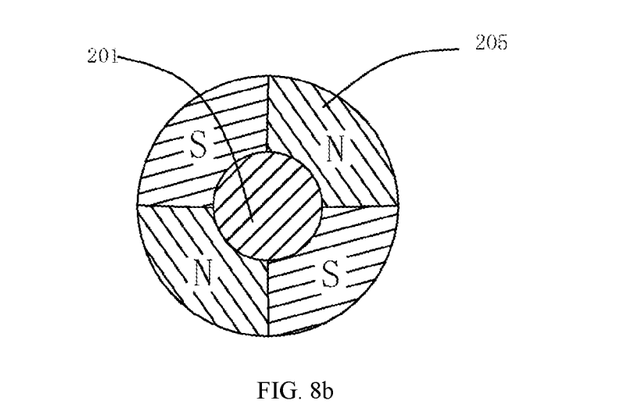
FIG. 8b is a schematic structural diagram of a rotor of a brushless motor involved in a spray gun according to another embodiment of the present disclosure.

As shown in FIG. 2, the brushless motor 202 of the present implementation is provided with a rotating shaft 201 and a motor body 203. A motor rotor is mounted to the rotating shaft 201, and the rotating shaft partially extends from the motor body 203 and is sleeved with the fan 204. As shown in FIGS. 8a and 8b, the motor rotor 205 includes bipolar magnetic shoes or qudrupolar magnetic shoes fixedly arranged on the rotating shaft 201. The motor body 203 includes a stator. A lamination thickness of a stator core is 0.2 mm.

In the present implementation, the fan 204 is configured as a centrifugal fan.

A handle 12 for an operator to hold is further formed on the first shell 10. A power switch 13 electrically connected to the brushless motor 202 may further be arranged in the handle 12. The power switch 13 may be matched with a switch trigger 38. The switch trigger 38, when being pulled inwards by a user to move, contacts with and drives the power switch 13 to be turned on, thereby starting the spray gun 100. A mounting portion configured to connect the direct-current power supply is further arranged at a lower end of the handle 12. In the present implementation, the direct-current power supply is a general battery pack 14 for an electric tool.

In a possible implementation, the handle 12 may also be connected detachably to the first shell 10.

The working head assembly includes a sleeve 30, a nozzle assembly 32, and a spray bar assembly 34. The sleeve 30 is connected to the first shell 10, and is provided with a nozzle mounting portion as well as a pot lid configured to connect the liquid storage pot 36. The nozzle assembly 32 is connected to the sleeve 30 through the nozzle mounting portion, and is arranged at an end of the sleeve 30 away from the fan module 20. The nozzle assembly 32 includes a nozzle and a nozzle regulator. The nozzle is provided with a liquid outlet. The nozzle regulator is configured for a user to operate, thereby regulating a shape of liquid to be sprayed. The spray bar assembly 34 is received in the sleeve 30, and is structured to be capable of move relative to the nozzle assembly 32 along an own longitudinal axis X1, thereby opening or closing the liquid outlet.

The switch trigger 38 is pivotably arranged on the sleeve 30. The switch trigger 38 is controlled by the user to move, thereby driving the spray bar assembly 34 to move to open the liquid outlet and further spray the paint out of the spray gun 100.

In a possible implementation, the sleeve 30 may be formed on the first shell 10 directly.

The liquid storage pot 36 provides liquid desired to be sprayed by the spray gun 100. For example, the liquid storage pot 36 is filled with paint to be supplied to the nozzle assembly 32. After the mounting portion is connected to the battery pack 14, an end portion of the battery pack 14 and a bottom surface of the liquid storage pot 36 extend in the same plane. Therefore, the battery pack 14 and the liquid storage pot 36 form support legs together for the firm placement of the spray gun 100.

The power assembly further includes an air pressure chamber 16 radially supported in the first shell 10. The fan module 20 is received in the air pressure chamber 16. Moreover, the air pressure chamber 16 is connected to the sleeve 30 by a detachable connecting piece, so as to form together an enclosed space for the movement of the airflow. That is, the airflow generated by the fan module 20 is completely provided for the sleeve 30 under the guidance of the air pressure chamber 16. It is to be noted that the air pressure chamber 16 here includes a shell thereof and an inner space defined by the shell.

In the present implementation, the air pressure chamber 16 is in clamping connection with the first shell 10.

An air duct communicated with the air pressure chamber 16 is formed between an inner wall of the sleeve 30 and an outer surface of the spray bar assembly 34. When the atomization airflow generated by the fan module 20 flows through the air pressure chamber 16 and the air duct and finally to the nozzle assembly 32, the following two parts of air may be formed.

One part of air is sprayed by the nozzle assembly 32 to atomize the sprayed paint by the Venturi principle. Meanwhile, negative pressure is formed at an opening of a suction pipe 35 to suck air away from the suction pipe 35, thereby forming negative pressure in the suction pipe 35 connected to the liquid storage pot 36.

The other part of air enters the liquid storage pot 36 through a communicating structure, thereby forming high pressure above a liquid surface in the liquid storage pot 36. As such, an air pressure difference is formed between the inside and outside of the suction pipe 35, thereby squeezing the paint out of the liquid storage pot 36 through the suction pipe 35 and finally providing the paint for the nozzle assembly 32.

It is to be noted that, referring to FIGS. 1 and 2, a "front-rear" direction described in the present disclosure may be wholly parallel to a direction of the airflow generated by the fan 204. For example, a position where the nozzle assembly 32 is located is regarded as a front end, and correspondingly, the fan module 20 is located rearward of the nozzle assembly 32.

Figure 3A:
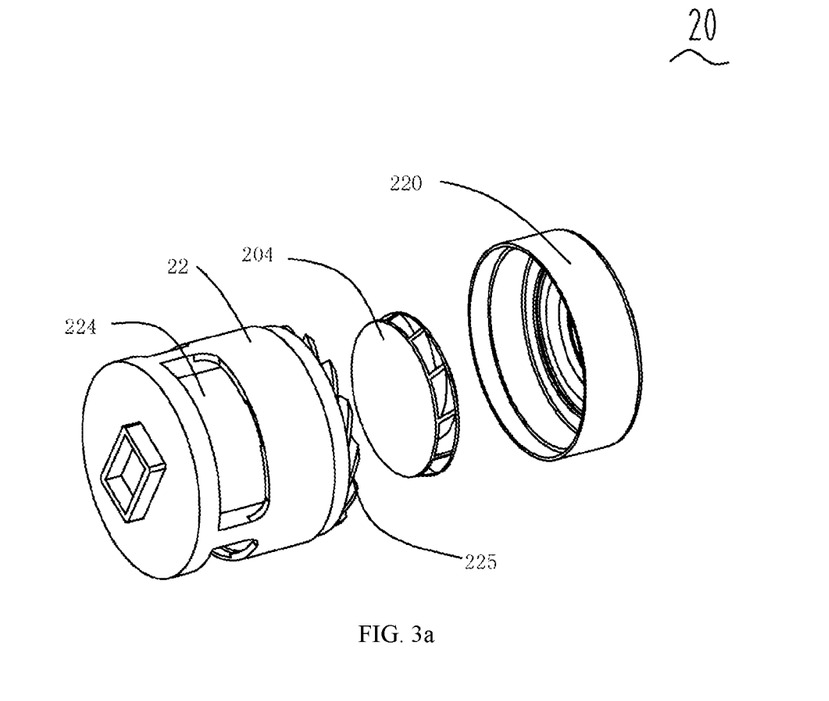
FIG. 3a is an exploded view of a fan module involved in the spray gun in FIG. 1.
Figure 3B:
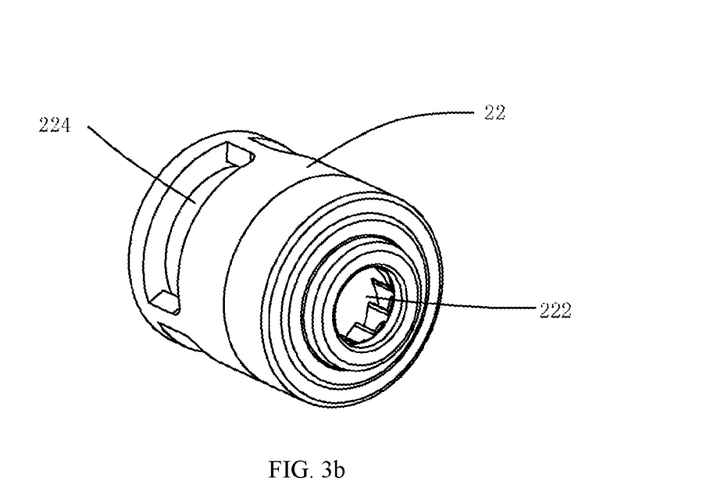
FIG. 3b is a schematic diagram of the fan module in FIG. 3a at another viewing angle.

As shown in FIGS. 2, 3a, and 3b, the fan module 20 of the present disclosure further includes a fan shell 22 receiving the brushless motor 202 and the fan 204. The fan shell 22 is provided with an air inlet ring cover 220. Specifically, the air inlet ring cover 220 is located at an upstream position of the brushless motor 202 in the direction of the airflow, and supports the fan 204 rotatably therein. The air inlet ring cover 220 is arranged close to a rear end of the air pressure chamber 16. A rear end of the air inlet ring cover 220 is provided with an air guide opening 222 embedded into a rear end of the fan 204. When the fan 204 rotates, the airflow enters the fan shell 22 from the air guide opening 222, and is driven by the centrifugal fan 204 radially towards an inner wall the air inlet ring cover 220. An air outlet 224 is further formed in the fan shell 22. The airflow, after flowing through the brushless motor 202, flows out of the fan shell 22 through the air outlet 224 and enters the air pressure chamber 16.

The fan module 20 is integrated with a bearing assembly configured to support the brushless motor 202 and the fan 204. Specifically, a rear bearing assembly configured to support the brushless motor 202 and the fan 204 is arranged at a rear end of the fan module 20. A front bearing assembly configured to support the brushless motor 202 and the fan 204 is arranged at a front end of the fan module 20. Therefore, before the brushless motor 202 and the fan 204 are placed in the air pressure chamber 16, the fan module 20 supports the brushless motor 202 and the fan 204 well.

As shown in FIG. 2, the fan module 20 of the present implementation is further integrated with a circuit board 206 configured to control the brushless motor 202 to operate. The circuit board 206 is fixedly connected to the fan shell 22 and received in the fan shell 22, and is located at a downstream position of the brushless motor 202 in the movement direction of the airflow.

Compared with the technical solution provided by the conventional art in which the motor and the fan are directly supported in the air pressure chamber, the present disclosure has the advantage that the components in the fan module 20 are fully integrated and concentrated, so that assembly procedures are reduced and simplified, and the assembly cost is reduced. The fan module 20 may be independently assembled as an assembly at a previous procedure before being placed in the air pressure chamber 16, so that many assembly procedures are omitted, the assembly efficiency is improved greatly, and the production cost is reduced.

As known to all, an HVLP paint gun 100 atomizes liquid by a high-speed airflow, and its working ability is mainly determined by an air volume and air pressure generated by the rotation of the fan 204. The air volume and the air pressure are positively correlated with a rotational speed of the fan 204 and a radial dimension of the fan 204.

In the conventional art, a brush DC motor serving as a drive source is relatively low in rotational speed, and in order to improve the working ability of the spray gun, it is necessary for the fan to have a large radial dimension. As a result, the tail of the spray gun is large and heavy.

The user, when holding the spray gun for spraying, puts the part between the thumb and the index against the upper end of the handle and presses the switch trigger with a finger. If the tail of the spray gun is relatively large, particularly when the spray gun is used for upward spraying, the arm of the user tends to interfere with an outer shell at the tail. In addition, the center of gravity of the whole spray gun is concentrated at the tail, which brings inconvenience to the operation of the user.

Therefore, in the conventional art, a tail shell receiving the motor and the fan is usually tilted up relative to the sleeve to avoid interferences. That is, in the conventional art, a rotation axis of the motor of the spray gun is arranged at an included angle to the longitudinal axis of the spray bar assembly.

In the present disclosure, the spray gun 100 uses the high-speed motor 202 as a drive source. Rated power of the motor 202 ranges from 250 W to 500 W, and a rotational speed of the motor ranges from 60,000 rpm to 120,000 rpm. Therefore, the radial dimension of the fan 204 may be reduced under the same working ability. Moreover, the motor 202 is a brushless motor with a higher energy density than a brush motor, so that a radial dimension of the motor 202 may also be reduced under the same working ability.

Preferably, power of the brushless motor 202 ranges from 250 W to 300 W.

In the present implementation, an outer diameter of the motor body ranges from 32 mm to 45 mm, and a radial dimension of the fan 204 ranges from 38 mm to 55 mm.

With the adoption of the high-speed brushless motor 202, the structure size of the fan module 20 is reduced. Therefore, the total weight of the spray gun 100 is reduced, namely load of the user when holding the spray gun 100 is reduced, and user experiences are improved.

Moreover, the significant reduction of the overall dimension of the brushless motor 202 and the fan 204 reduces the overall size of the fan module 20 greatly, thereby improving the mounting flexibility of the fan module 20 in the air pressure chamber 16 and making it possible that the longitudinal axis X1 of the spray bar assembly 34 is parallel to or coincident with a rotation axis X2 of the brushless motor 202.

Here, a maximum outer diameter of the fan module 20 is defined as D1. Under normal circumstances, an outer diameter of the air inlet ring cover 220 corresponding to an axial position where a fan blade of the fan 204 is located is the maximum outer diameter D1 of the fan module 20.

As shown in FIGS. 1, 2, 3a, and 3b, the first implementation of the present disclosure is illustrated. In the present implementation, the maximum outer diameter D1 of the fan module 20 ranges from 30 mm to 45 mm. This size range is relatively small, so that it is possible to make the longitudinal axis X1 of the spray bar assembly 34 coincident with the rotation axis X2 of the brushless motor 202. Therefore, the spray gun 100 is more compact in structure, and has a center of gravity closer to the part between the thumb and the index when the user holds the spray gun, which brings conveniences to the manipulation of the user.

Figure 4:
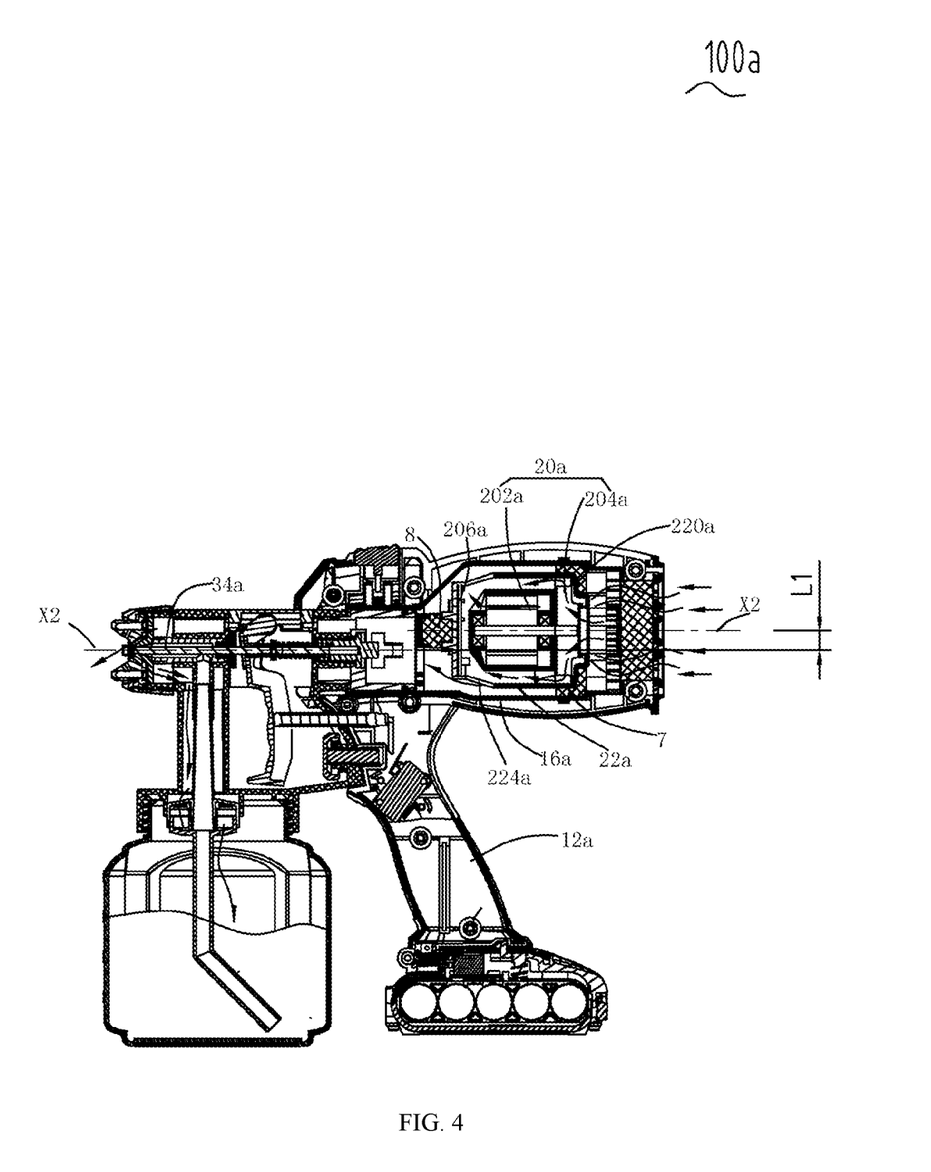
FIG. 4 is a sectional view of a spray gun according to a second implementation of the present disclosure.

As shown in FIG. 4, a second implementation of the present disclosure is illustrated. A spray gun 100a provided in the present implementation is basically the same as the spray gun 100 provided in the first implementation in functional structure. The difference is that a maximum outer diameter of a fan module 20a is larger than that of the fan module 20 in the first implementation. Therefore, the fan module 20a has a different layout.

Like the first implementation, the fan module 20a of the present implementation includes a fan shell 22a, a fan 204a, and a brushless motor 202a. The fan shell 22a is provided with an air inlet ring cover 220a and an air outlet 224a. When the fan 204a rotates, an airflow flows into the fan shell 22a from the air inlet ring cover 220a, and flows into an air pressure chamber 16a from the air outlet 224a.

The fan module 20a is further integrated with front and rear bearing assemblies configured to support a rotating shaft of the motor. Therefore, the brushless motor 202a and the fan 204a are already supported well before being placed in the air pressure chamber 16a.

The fan module 20a is further integrated with a circuit board 206a configured to control the motor 202a to operate. The circuit board 206a is fixedly connected to the fan shell 22a, and is arranged at a downstream position of the brushless motor 202a in a movement direction of the airflow. Therefore, the components in the fan module 20a may be fully integrated and concentrated, which reduces and simplifies assembly procedures and reduces the assembly cost.

In the present implementation, the maximum outer diameter D1 of the fan module 20a ranges from 45 mm to 80 mm. In such case, if a longitudinal axis X1 of a spray bar assembly 34a is still arranged coincident with a rotation axis X2 of the motor 202a, like in the first implementation, a lowermost end of a first shell 10a tends to interfere with an arm of a user when the user holds a handle 12a for spraying, particularly for upward spraying.

Therefore, in the present implementation, in a case that the maximum outer diameter D1 is greater than 45 mm and less than or equal to 80 mm, the longitudinal axis X1 of the spray bar assembly 34a is parallel to the rotation axis X2 of the motor 202a. Moreover, the rotation axis X2 of the brushless motor 202a is arranged farther away from the handle 12a than the longitudinal axis X1 of the spray bar assembly 34a.

A preferred design solution for the manipulation of the spray gun 100 may be implemented as follows: a best ratio of a distance L1 between the longitudinal axis X1 of the spray bar assembly 34 and the rotation axis X2 of the brushless motor 202 to the maximum outer diameter D1 of the fan module 20 is selected. Here, a radial dimension of the sleeve 30 receiving the spray bar assembly 34 is a normal dimension, approximately ranging from 30 mm to 40 mm. If a ratio of the distance L1 between the longitudinal axis X1 of the spray bar assembly 34 and the rotation axis X2 of the brushless motor 202 to the maximum outer diameter D1 of the fan module 20 is too high, the fan module 20 is arranged farther away from the spray bar assembly 34, namely the center of gravity of the whole spray gun 100 is arranged at a higher position. As a result, the spray gun 100 is difficult to manipulate and large in overall structure size. The best ratio of the distance L1 between the longitudinal axis X1 of the spray bar assembly 34 and the rotation axis X2 of the brushless motor 202 to the maximum outer diameter D1 of the fan module 20 is also determined by a value range of the maximum outer diameter D1. The spray gun 100 is arranged in this value range. In a case that the maximum outer diameter D1 is more than or equal to 30 mm and less than or equal to 45 mm, the longitudinal axis X1 of the spray bar assembly 34 is coincident with the rotation axis X2 of the brushless motor 202. In a case that the maximum outer diameter D1 is greater than 45 mm and less than or equal to 80 mm, the distance L1 between the longitudinal axis X1 of the spray bar assembly 34 of the spray gun 100 and the rotation axis X2 of the brushless motor 202 satisfies (D1−45)/2+2.5 mm≤L1≤20 mm. Here, a maximum distance between the longitudinal axis X1 of the spray bar assembly 34 and the rotation axis X2 of the brushless motor 202 is limited to 20 mm. When the distance L1 between the longitudinal axis X1 of the spray bar assembly 34 and the rotation axis X2 of the brushless motor 202 is greater than 20 mm, the fan module is arranged away from the spray bar assembly, namely the fan module is arranged away from the sleeve. In such case, the spray gun is large in overall structure size and has a center of gravity at an upper position, which is unfavorable for manipulation.

The distance between the longitudinal axis X1 of the spray bar assembly 34 and the rotation axis X2 of the brushless motor 202 ranges from 2.5 mm to 20 mm in a direction perpendicular to the longitudinal axis X1. Preferably, the distance between the longitudinal axis X1 of the spray bar assembly and the rotation axis X2 is 10 mm in the direction perpendicular to the longitudinal axis X1 of the spray bar assembly 34a.

In the present disclosure, the maximum outer diameter D1 of the fan module ranges from 30 mm to 80 mm, and a maximum outer diameter of a tail of the first shell ranges from 42 mm to 92 mm.

With the adoption of the high-speed brushless motor, the fan module of the present disclosure is smaller in structure size. Therefore, the mounting flexibility of the fan module in the air pressure chamber is improved, and it is possible to make the longitudinal axis X1 of the spray bar assembly parallel to or coincident with the rotation axis X2 of the brushless motor to achieve a more compact overall layout.

As shown in FIG. 2, the air, after passing through the air inlet ring cover 220, may flow to a front end of the air pressure chamber 16 along an inner wall of the air inlet ring cover 220, and the circuit board 206 may act as a role blocking the air at an air outlet position of the air pressure chamber 16.

Correspondingly, the smaller a diameter of the circuit board 206 at the air outlet position is, or, the smaller an outer diameter of the fan shell 22 corresponding to an axial position where the circuit board 206 is located is, the lower resistance to the airflow driven by the fan 204 is, and the lower air resistance and loss are.

Based on this consideration, the circuit board 206 is fixedly connected to a downstream position of the motor body 203 in the direction of the airflow.

Here, the outer diameter of the fan shell 22 corresponding to the axial position where the circuit board 206 is located is defined as D2. D1 is not less than D2. Specifically, a value of D2 ranges from 40 mm to 55 mm. Further, in order to reduce the air resistance, the diameter of the circuit board 206 is preferably as small as possible. Preferably, the diameter of the circuit board 206 is 40 mm.

In the present disclosure, the rotational speed of the brushless motor ranges from 60,000 rpm to 120,000 rpm. As a result, the fan module vibrates violently during a spraying operation of the spray gun, affecting the user comfort in holding.

Therefore, in the present disclosure, the fan module is suspended in the first shell or the air pressure chamber through a damping structure, to attenuate vibrations generated by the fan module in a high-speed rotation process and reduce vibrations felt by the user when holding the spraying equipment.

Preferably, the damping structure is made from a buffer material, which may be a spring material, a sponge material, etc. Preferably, the damping structure is made from a rubber material, particularly polyurethane rubber.

As shown in FIGS. 2 and 4, the same damping structure is used in the first and second implementations of the present disclosure, including a first damper 8 and second damper 7 that are arranged in the direction of the airflow.

Related descriptions will be made to the damping structure taking the first implementation as an example. As shown in FIGS. 2 and 3, the first damper 8 is arranged close to the front end of the fan module 20, and the second damper 7 is arranged close to the rear end of the fan module 20. The fan module 20 is axially located between the first damper 8 and the second damper 7. The first damper 8 and the second damper 7 axially clamp the fan module 20, thereby limiting the fan module 20 axially in a front-rear direction. The first damper 8 or the second damper 7 circularly sleeves the fan module 20, thereby supporting and limiting the fan module 20 radially. Therefore, vibrations may be buffered and attenuated axially and radially.

Specifically, the fan module 20 is supported in the air pressure chamber 16 through the damping structure. In the present implementation, the air pressure chamber 16 may be fixedly mounted in the first shell 10.

Certainly, in the present disclosure, without limitations, the air pressure chamber 16 may also be arranged in the first shell 10 through a damping structure (e.g., a damping structure in the following implementations), so as to form secondary damping.

In order to damp vibrations at the front end of the fan module 20, the air pressure chamber 16 is provided with a mounting portion at a downstream position of the fan module 20 in the direction of the airflow. The first damper 8 is axially clamped between the fan shell 22 and the mounting portion. The second damper 7 is arranged between the air inlet ring cover 220 and the air pressure chamber 16 in a circular sleeving manner.

Specifically, as shown in FIG. 2, the air pressure chamber 16 is provided with a front air pressure shell 6 and a rear air pressure shell 5. A front end of the front air pressure shell 6 is fixedly sleeved with the sleeve 30. The mounting portion may be structured as an air flowing plate 9 arranged at the front end of the air pressure chamber 16. The air flowing plate 9 is provided with air vents. The air flowing plate 9 is axially opposite to the circuit board 206. An end face of the rear air pressure shell 5 is provided with air inlet mesh openings. A filter screen 4 is arranged between a rear side of the rear air pressure shell 5 and a rear cover 3 of the first shell. An outside airflow enters the fan shell 22 through the air inlet mesh openings of the rear air pressure shell 5 after flowing through the rear cover 3 of the first shell and the filter screen 4.

The fan shell 22 is provided with a first insertion groove at a side facing the mounting portion 9. The mounting portion 9 is provided with a second insertion groove at a side facing the circuit board 206. Two axial ends of the first damper 8 are inserted into the first insertion groove and the second insertion groove respectively. The first damper 8 is clamped between the mounting portion 9 and the fan shell 22. The first damper 8 is matched with the second damper 7 to axially clamp the fan module 20.

The second damper 7 may be a rubber ring sleeve circularly sleeving the fan module 20. The air inlet ring cover 220 is fixedly sleeved in the second damper 7, and is fixedly connected to the motor body 203 of the fan module 20. An air guide structure 225 may be arranged at a front side of the air inlet ring cover 220. The air guide structure 225 fixedly sleeves the motor body 203. The air guide structure 225 is circumferentially provided with an air guide hole, thereby guiding the airflow formed by the rotation of the fan 204 as desired to reduce the air resistance to the airflow in the fan shell 22.

The second damper 7 is sleeved in the rear air pressure shell 5 to fill the space between the rear air pressure shell 5 and the air inlet ring cover 220. A front axial limiting table is formed on a rear wall of the air inlet ring cover 220. The rear air pressure shell 5 is reduced inwards in diameter to form a rear axial limiting table. The second damper 7 is at least partially located between the front axial limiting table and the rear axial limiting table.

As shown in FIG. 2, a longitudinal section of the second damper 7 of a circular sleeve structure is wholly of an "L"-shaped structure. Therefore, the second damper 7 axially limits and radially supports the fan module 20.

A longitudinal section of the first damper 8 is wholly of a "cross-like" structure. The first damper 8 may be of a cylindrical structure with three sections. An outer diameter of the middle cylindrical section is greater than those of the front-side and rear-side cylindrical sections. The front-side cylindrical section is inserted into the first insertion groove by interference fit. The rear-side cylindrical section is inserted into the second insertion groove by interference fit.

Figure 5:
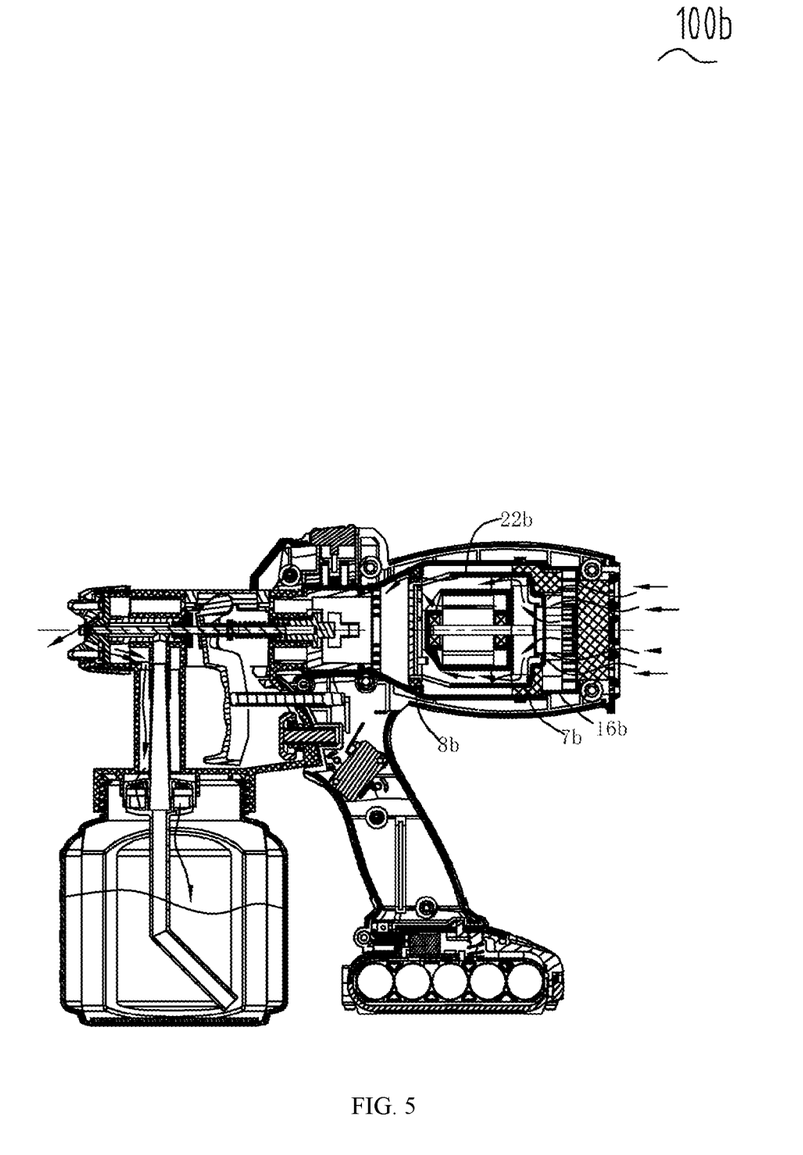
FIG. 5 is a sectional view of a spray gun according to a third implementation of the present disclosure.

As shown in FIG. 5, a spray gun 100b of a third implementation of the present disclosure is illustrated. In the present implementation, a first damper 8b may also be arranged between a fan shell 22b and an air pressure chamber 16b in a circular sleeving manner. An outer circular insertion groove is formed in an outer circumferential wall of the fan shell 22b, and the first damper 8b may be inserted into the outer circular insertion groove in a circular sleeving manner. Correspondingly, the air pressure chamber 16b is also provided with an inner circular insertion groove at a corresponding axial position, and the first damper 8b is also inserted into the inner circular insertion groove. As such, the first damper 8b and a fan module 20b are limited axially. The first damper 8b is provided with axially through communicating holes for an airflow to pass through. Multiple communicating holes are circumferentially uniformly distributed in the first damper 8b, thereby circumferentially uniformly discharging the air.

A second damper 7b in this implementation may refer to the second damper 7 in the above-mentioned implementation, and will not be elaborated in this implementation.

Figure 6:
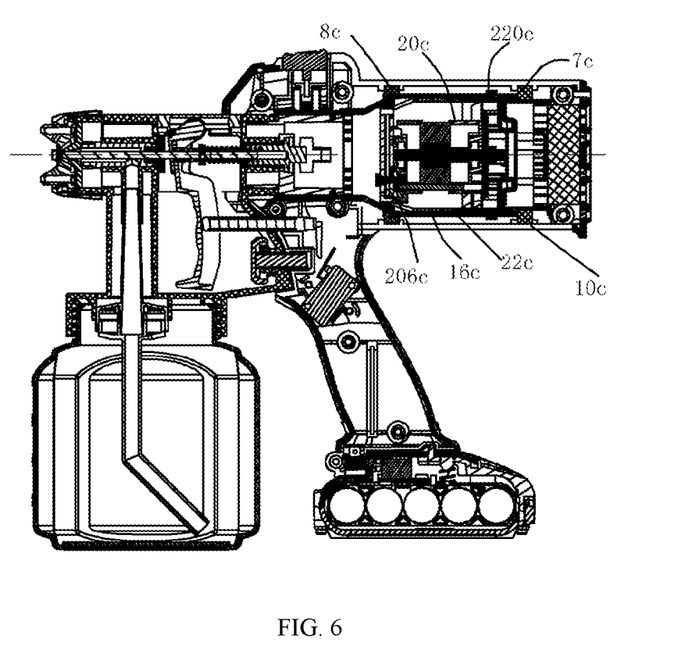
FIG. 6 is a sectional view of a spray gun according to a fourth implementation of the present disclosure.

As shown in FIG. 6, a spray gun 100c of a fourth implementation of the present disclosure is illustrated. In the present implementation, a fan shell 22c is fixedly connected to an air pressure chamber 16c. The air pressure chamber 16c is mounted in a first shell 10c through a damping structure. Therefore, vibrations generated by a fan module 20c are transmitted to the air pressure chamber 16c first when being transmitted to the first shell 10c, and then are transmitted to the first shell 10c after being attenuated by the damping structure. Therefore, the vibrations transmitted to the first shell 10c are relatively weak, and user experiences in manipulation holding the spray gun are improved.

Certainly, the solution in the above-mentioned implementation may also be used for the fan module 20c in the present implementation. That is, the fan module 20c is mounted in the air pressure chamber 16c through a damping structure, so as to form secondary damping. No limits are made thereto in the present disclosure.

In the present implementation, a first damper 8c and a second damper 7c fixedly circularly sleeves an outer wall of the air pressure chamber 16c. The first damper 8c and the second damper 7c are arranged close to a front end (e.g., a circuit board 206c) and rear end (e.g., an air inlet ring cover 220c) of the fan module 20c respectively. A front insertion groove (not shown) and a rear insertion groove (not shown) are formed in an outer wall of the air pressure chamber 16c. The first damper 8c and the second damper 7c are rubber rings inserted into the front insertion groove and the rear insertion groove respectively. The front insertion groove and the rear insertion groove axially limit the first damper 8c and the second damper 7c respectively, thereby avoiding axial displacements during rotation. The first damper 8c and the second damper 7c partially protrude from the corresponding insertion grooves and contact with an inner wall of the first shell 10c, so as to form buffering and damping.

Figure 7:
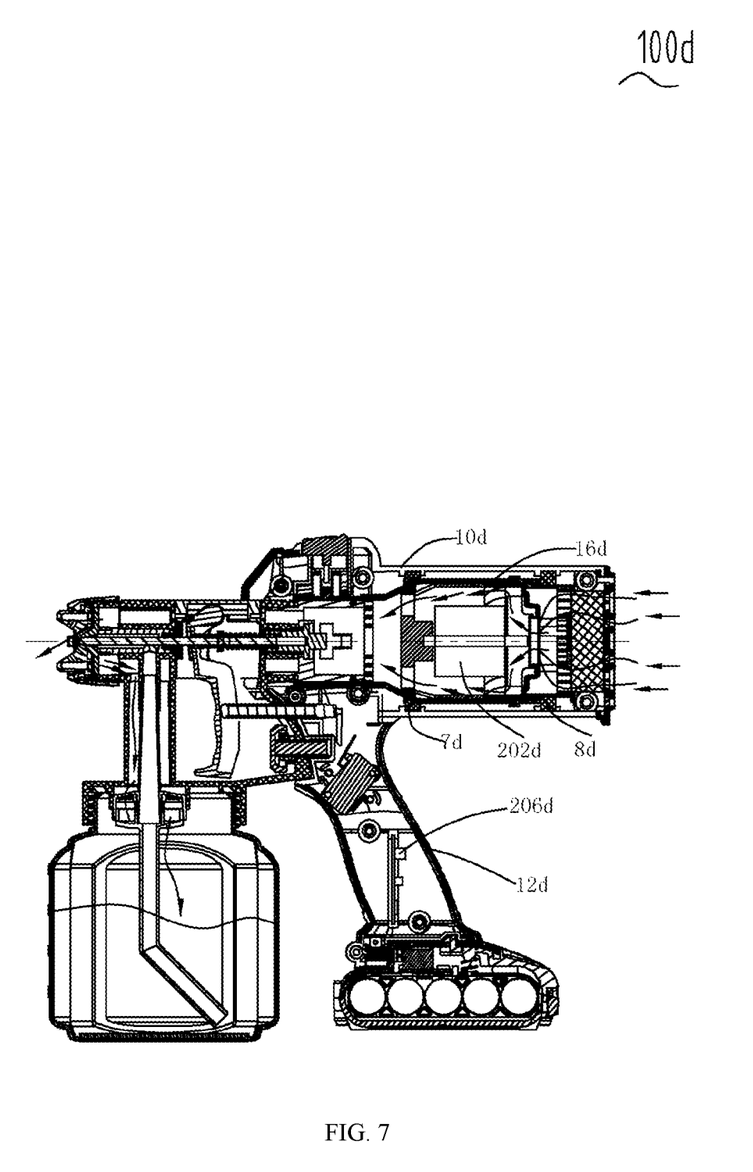
FIG. 7 is a sectional view of a spray gun according to a fifth implementation of the present disclosure.

As shown in FIG. 7, a spray gun 100d of a fifth implementation of the present disclosure is illustrated. In the present implementation, a fan shell 22d is fixedly connected to an air pressure chamber 16d. The air pressure chamber 16d is mounted in a first shell 10d through a damping structure. Moreover, a circuit board 206d configured to control a motor 202d to operate is arranged in a handle 12d rather than the air pressure chamber 16d.

Certainly, in the present implementation, a fan module 20d may also be supported in the air pressure chamber 16d through a damping structure. No limits are made thereto in the present disclosure.

Any numerical value used herein by reference includes all values of lower values and upper values increasing progressively by a unit from a lower limit value to an upper limit value, and any lower value is spaced from any higher value by at least two units. For example, if it is described that a value indicating the number of a part or a process variable (e.g., a temperature, pressure, or time) ranges from 1 to 90, preferably from 20 to 80, more preferably from 30 to 70, it indicates that values such as 15 to 85, 22 to 68, 43 to 51, or 30 to 32 are also enumerated clearly in the specification. For a value less than 1, it is considered as appropriate that a unit is 0.0001, 0.001, 0.01, or 0.1. These are merely examples to be presented clearly, and all possible combinations of numerical values between the minimum value and the maximum value may be considered as being described clearly in the specification in a similar way.

Unless otherwise stated, all ranges include all numerals between end points. "About" or "approximately" used together with a range is suitable for two end points of this range. Therefore, "about 20 to 30" is intended to cover "about 20 to about 30", at least including specified end points.

All disclosed articles and references, including patent applications and publications, are incorporated herein by reference for various purposes. Term "basically consisting of . . . " describing a combination should include determined elements, compositions, components or steps as well as other elements, compositions, components or steps that substantially do not affect the basic novelty of the combination. When term "include" or "comprise" is used to describe a combination of elements, compositions, components or steps herein, implementations basically formed by these elements, compositions, components or steps are also considered. Term "may" is used here to indicate any described attribute that "may" be included is optional.

Multiple elements, compositions, components or steps may be provided by a single integrated element, composition, component or step. Alternatively, a single integrated element, composition, components or step may be divided into multiple separate elements, compositions, components or steps. The disclosure of "a/an" or "one" for describing an element, a composition, a component or a step is not for excluding other elements, compositions, components or steps.

It is to be understood that the above description is only for graphic illustration rather than limiting. Many implementations and applications except the provided examples are apparent to those skilled in the art upon reading the above description. Therefore, the scope of the teaching should be determined with reference to the appended claims and all scopes of equivalents of these claims rather than the above description. For comprehensiveness, the disclosure of all articles and references, including patent applications and publications, is incorporated herein by reference. The omission of any aspect of the subject matter disclosed herein in the preceding claims is not intended to disclaim the content of this subject matter or indicate that the inventor does not consider this subject matter as a part of the disclosed subject matter of the present disclosure.

What is claimed is:

1. A spray gun for atomizing a liquid by an airflow, comprising:
   a first shell;
   a fan module, received in the first shell, for generating the airflow, the fan module comprising a brushless motor and a fan driven to rotate by the brushless motor;
   a sleeve, formed or mounted on the first shell;
   a nozzle assembly, disposed at an end of the sleeve away from the fan module and provided with a liquid outlet;
   a spray bar assembly, received in the sleeve and configured to move along a longitudinal axis of the spray bar assembly to open or close the liquid outlet, and
   a handle for an operator to hold,
   wherein the fan module has a maximum outer diameter D1 between 30 mm and 80 mm, and a rotation axis of the brushless motor is parallel to or coincident with the longitudinal axis of the spray bar assembly,
   in a case that the maximum outer diameter D1 is more than or equal to 30 mm and less than or equal to 45 mm, the rotation axis of the brushless motor is coincident with the longitudinal axis of the spray bar assembly; or
   in a case that the maximum outer diameter D1 is greater than 45 mm and less than or equal to 80 mm, the rotation axis of the brushless motor is parallel to the longitudinal axis of the spray bar assembly at a distance L1 satisfying $(D1-45)/2+2.5$ mm$\leq L1 \leq 20$ mm, the rotation axis of the brushless motor is further away from the handle than the longitudinal axis of the spray bar assembly in a direction perpendicular to the longitudinal axis.

2. The spray gun according to claim 1, wherein the spray gun further comprises an air pressure chamber radially supported in the first shell, the fan module is received in the air pressure chamber.

3. The spray gun according to claim 2, wherein the fan module further comprises a fan shell; the fan and the brushless motor are sequentially arranged in the fan shell in a movement direction of the airflow; the fan shell is provided with an air inlet ring cover and an air outlet; when the fan rotates, the airflow enters the fan shell from the air inlet ring cover and flows from the air outlet to the air pressure chamber.

4. The spray gun according to claim 3, wherein the fan module is supported in the air pressure chamber by a vibration damping structure.

5. The spray gun according to claim 3, wherein the fan is rotatably provided in the air inlet ring cover, and an outer diameter of the inlet ring cover corresponding to a location of a fan blade along an axis of the fan is the maximum outer diameter D1 of said fan module.

6. The spray gun according to claim 3, wherein the fan module further comprises a circuit board configured to control an operation of the brushless motor, the circuit board is fixedly connected to the fan shell and arranged downstream of the brushless motor along the movement direction of said airflow.

7. The spray gun according to claim 6, wherein an outer diameter of the fan shell corresponding to an axial position where the circuit board is located is D2, wherein $D2 \leq D1$.

8. The spray gun according to claim 7, wherein a value of D2 ranges from 40 mm to 55 mm.

9. The spray gun according to claim 1, wherein the brushless motor has a rated power between 250 W and 500 W and a speed range between 60000 rpm and 120000 rpm.

10. A spray gun for atomizing a liquid by an airflow, comprising:
    a first shell;
    a fan module, received in the first shell, for generating the airflow, the fan module comprising a brushless motor and a fan driven to rotate by the brushless motor;
    a sleeve, formed or mounted on the first shell;
    a nozzle assembly, disposed at an end of the sleeve away from the fan module and provided with a liquid outlet; and
    a spray bar assembly, received in the sleeve and configured to move along a longitudinal axis of the spray bar assembly to open or close the liquid outlet,
    wherein the fan module has a maximum outer diameter D1 between 30 mm and 80 mm, and a rotation axis of the brushless motor is parallel to or coincident with the longitudinal axis of the spray bar assembly,
    wherein the spray gun further comprises an air pressure chamber radially supported in the first shell, the fan module is received in the air pressure chamber,
    wherein the fan module further comprises a fan shell; the fan and the brushless motor are sequentially arranged in the fan shell in a movement direction of the airflow; the fan shell is provided with an air inlet ring cover and an air outlet; when the fan rotates, the airflow enters the fan shell from the air inlet ring cover and flows from the air outlet to the air pressure chamber.

11. The spray gun according to claim 10, wherein the fan module is supported in the air pressure chamber by a vibration damping structure.

12. The spray gun according to claim 10, wherein the fan is rotatably provided in the air inlet ring cover, and an outer diameter of the inlet ring cover corresponding to a location of a fan blade along an axis of the fan is the maximum outer diameter D1 of said fan module.

13. The spray gun according to claim 10, wherein the fan module further comprises a circuit board configured to control an operation of the brushless motor, the circuit board is fixedly connected to the fan shell and arranged downstream of the brushless motor along the movement direction of said airflow.

14. The spray gun according to claim 13, wherein an outer diameter of the fan shell corresponding to an axial position where the circuit board is located is D2, wherein $D2 \leq D1$.

15. The spray gun according to claim 14, wherein a value of D2 ranges from 40 mm to 55 mm.

16. The spray gun according to claim 10, wherein the brushless motor has a rated power between 250 W and 500 W and a speed range between 60000 rpm and 120000 rpm.

* * * * *